(12) United States Patent
Suzuki et al.

(10) Patent No.: US 11,929,676 B2
(45) Date of Patent: Mar. 12, 2024

(54) POWER CONVERSION APPARATUS, MOTOR DRIVE APPARATUS, BLOWER, COMPRESSOR, AND AIR CONDITIONER

(71) Applicant: Mitsubishi Electric Corporation, Tokyo (JP)

(72) Inventors: Motoya Suzuki, Tokyo (JP); Kenji Iwazaki, Tokyo (JP); Satoru Ichiki, Tokyo (JP); Koichi Arisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 206 days.

(21) Appl. No.: 17/641,672

(22) PCT Filed: Nov. 14, 2019

(86) PCT No.: PCT/JP2019/044745
§ 371 (c)(1),
(2) Date: Mar. 9, 2022

(87) PCT Pub. No.: WO2021/095208
PCT Pub. Date: May 20, 2021

(65) Prior Publication Data
US 2022/0329156 A1 Oct. 13, 2022

(51) Int. Cl.
*H02M 3/158* (2006.01)
*F24F 7/007* (2006.01)
(Continued)

(52) U.S. Cl.
CPC ............ *H02M 3/158* (2013.01); *F24F 7/007* (2013.01); *F25B 31/026* (2013.01); *H02M 1/0009* (2021.05); *H02P 27/08* (2013.01)

(58) Field of Classification Search
CPC ...... H02M 3/158; H02M 1/0009; F24F 7/007; F25B 31/026; H02P 27/08
See application file for complete search history.

(56) References Cited

U.S. PATENT DOCUMENTS

2015/0102759 A1  4/2015  Shimomugi et al.
2015/0256117 A1* 9/2015  Suzuki ............... H02P 27/085
                                                    62/160

(Continued)

FOREIGN PATENT DOCUMENTS

| JP | 2015-220976 A | 12/2015 |
| JP | 2017-208976 A | 11/2017 |
| WO | 2013/157303 A1 | 10/2013 |

OTHER PUBLICATIONS

International Search Report of the International Searching Authority dated Jan. 28, 2020, issued in corresponding International Application No. PCT/JP2019/044745 (and English Machine Translation).

*Primary Examiner* — Zoheb S Imtiaz
(74) *Attorney, Agent, or Firm* — POSZ LAW GROUP, PLC

(57) ABSTRACT

A power conversion apparatus includes a converter circuit converting alternating current voltage output from an AC power supply into direct current voltage. The converter circuit includes unit converters. The power conversion apparatus generates a reference duty based on detection values of a current detector and a voltage detector, and generates a pulse width modulation signal based on a result of comparison between a carrier signal and a corrected duty obtained by correcting the reference duty. When a first reference duty in a first carrier period differs from a second reference duty in a second carrier period subsequent to the first carrier period, a first corrected duty of a first phase in a first carrier period in one power supply period after and a second corrected duty of a second phase in the first carrier period in one power supply period after are controlled to have different values.

15 Claims, 11 Drawing Sheets

(51) Int. Cl.
*F25B 31/02* (2006.01)
*H02M 1/00* (2006.01)
*H02P 27/08* (2006.01)

(56) References Cited

U.S. PATENT DOCUMENTS

2015/0333629 A1   11/2015  Jang et al.
2016/0028340 A1*  1/2016  Nakai ..................... H02P 21/06
                                                        318/400.02

\* cited by examiner

US 11,929,676 B2

POWER CONVERSION APPARATUS, MOTOR DRIVE APPARATUS, BLOWER, COMPRESSOR, AND AIR CONDITIONER

CROSS REFERENCE TO RELATED APPLICATION

This application is a U.S. National Stage Application of International Patent No. PCT/JP2019/044745 filed on Nov. 14, 2019, the disclosure of which is incorporated herein by reference.

TECHNICAL FIELD

The present invention relates to a power conversion apparatus that converts an alternating-current (AC) voltage output from an AC power supply into a direct-current (DC) voltage, to a motor drive apparatus including the power conversion apparatus, to a blower and to a compressor including the motor drive apparatus, and to an air conditioner including the blower or the compressor.

BACKGROUND

Patent Literature 1 below describes an interleaved converter that generates a desired output voltage by driving n-phase switching output stages with a phase difference of 360 degrees(°)/n, which interleaved converter provides balance control of reactor currents flowing through reactors of respective phases on the basis of the return current signal based on the detection current detected for each reactor, and on the return voltage signal.

PATENT LITERATURE

Patent Literature 1: Japanese Patent Application Laid-open No. 2017-208976

The current balance control technique described in Patent Literature 1 equalizes reactor currents of respective phases. However, the technology of Patent Literature 1 requires individual detection of reactor currents in the respective phases, thereby requiring a current detector on a per phase basis. Thus, the technology of Patent Literature 1 presents a problem of an increase in manufacturing cost.

SUMMARY

The present invention has been made in view of the foregoing, and it is an object of the present invention to provide a power conversion apparatus capable of equalizing reactor currents while reducing an increase in manufacturing cost.

To solve the problem described above and achieve the object, a power conversion apparatus according to the present invention includes a converter circuit comprising unit converters corresponding to a respective plurality of phases and converting an alternating current voltage output from an alternating current power supply into a direct current voltage, the unit converters each comprising a reactor and at least one switching element. The power conversion apparatus further includes a current detector detecting a sum of currents flowing through the reactors; and a voltage detector detecting an output voltage of the converter circuit. The power conversion apparatus further includes a control device generating a reference duty on a basis of detection values detected by the current detector and by the voltage detector, and generating a pulse width modulation signal for controlling the switching element on a basis of a result of comparison between a corrected duty and a carrier signal, the corrected duty being obtained by correcting the reference duty. A carrier period is shorter than a power supply period, the carrier period being a period of the carrier signal and the power supply period being a period of the alternating current voltage. When a first reference duty in a first carrier period differs from a second reference duty in a second carrier period subsequent to the first carrier period, a first corrected duty and a second corrected duty are controlled to have different values from each other. The first corrected duty is a corrected duty of a first phase in a first carrier period in one power supply period after. The second corrected duty is a corrected duty of a second phase in the first carrier period in the one power supply period after.

A power conversion apparatus according to the present invention provides an advantage in being capable of equalizing reactor currents while reducing an increase in manufacturing cost.

DETAILED DESCRIPTION

A power conversion apparatus, a motor drive apparatus, a blower, a compressor, and an air conditioner according to embodiments of the present invention will be described below with reference to the accompanying drawings. Note that the following embodiments are not intended to limit the scope of the present invention. Note also that the following description refers to an electrical connection simply as "connection".

First Embodiment

Figure 1:
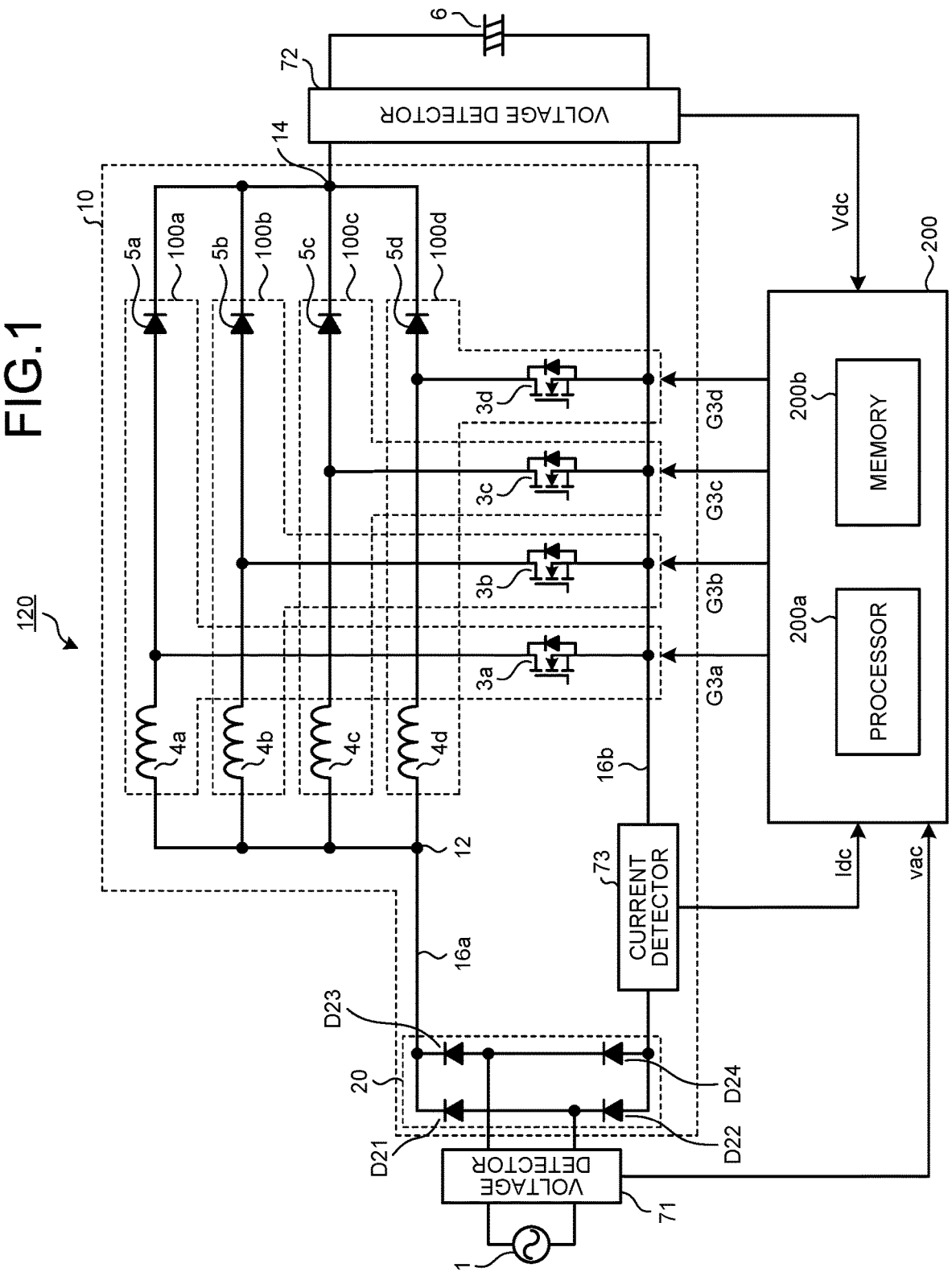
FIG. 1 is a diagram illustrating a configuration of a power conversion apparatus according to a first embodiment.

FIG. 1 is a diagram illustrating a configuration of a power conversion apparatus 120 according to a first embodiment. The power conversion apparatus 120 according to the first embodiment includes a converter circuit 10, a smoothing capacitor 6, voltage detectors 71 and 72, a current detector 73, and a control device 200.

The converter circuit 10 converts an AC voltage output from an AC power supply 1 into a DC voltage. The smoothing capacitor 6 smooths and holds the DC voltage obtained by the conversion performed by the converter circuit 10.

The converter circuit 10 includes unit converters 100a, 100b, 100c, and 100d and a rectification circuit 20.

In the converter circuit 10, the unit converters 100a, 100b, 100c, and 100d are connected in parallel with one another. The unit converters 100a, 100b, 100c, and 100d operate sequentially with a predetermined period. This period is called "interleaving period".

The rectification circuit 20 includes four diodes D21, D22, D23, and D24 connected in a bridge configuration. The rectification circuit 20 rectifies the AC voltage output from the AC power supply 1, and applies the voltage that has been rectified to the unit converters 100a, 100b, 100c, and 100d.

The unit converter 100a includes a reactor 4a, a backflow-preventing diode 5a, and a switching element 3a. The unit converter 100b includes a reactor 4b, a backflow-preventing diode 5b, and a switching element 3b. The unit converter 100c includes a reactor 4c, a backflow-preventing diode 5c, and a switching element 3c. The unit converter 100d includes a reactor 4d, a backflow-preventing diode 5d, and a switching element 3d.

In the converter circuit 10, a combination of one reactor and one switching element is defined as "phase", and is counted as "one phase".

FIG. 1 illustrates an example of four phases having a configuration for four-phase interleaving. The phases are identified by suffixes of a, b, c, and d. Operations of the respective phases may hereinafter be indicated by "phase a", "phase b", "phase c", and "phase d". Note that the application of the present invention is not limited to four-phase interleaving, but may also be two-, three-, or five-or-more-phase interleaving. That is, the present invention is directed to an interleaved power conversion apparatus that includes unit converters for respective multiple phases.

The converter circuit 10 includes a junction point 12, at which ends on one side of the respective reactors 4a, 4b, 4c, and 4d are connected to one another. The junction point 12 and one end of the rectification circuit 20 are connected to each other via an electric wire 16a. The converter circuit 10 also includes a junction point 14, at which the cathodes of respective backflow-preventing diodes 5a, 5b, 5c, and 5d are connected to one another. The junction point 14 is connected to the positive electrode-side terminal of the smoothing capacitor 6.

In addition, in the unit converter 100a, the reactor 4a has another end connected to the anode of the backflow-preventing diode 5a. The junction point of the reactor 4a and the backflow-preventing diode 5a is connected to one end of the switching element 3a. The unit converters 100b, 100c, and 100d are configured similarly to the unit converter 100a. In addition, in the unit converters 100a, 100b, 100c, and 100d, the switching elements 3a, 3b, 3c, and 3d have another ends also connected to one another. The other ends of the respective switching elements 3a, 3b, 3c, and 3d and another end of the rectification circuit 20 are connected to each other via an electric wire 16b.

An example of each of the switching elements 3a, 3b, 3c, and 3d is a metal oxide semiconductor field-effect transistor (MOSFET). An insulated gate bipolar transistor (IGBT) may be used instead of a MOSFET.

The switching elements 3a, 3b, 3c, and 3d each include a diode connected in antiparallel between the drain and the source. Connection in antiparallel means that the drain of a MOSFET is connected with the cathode of the diode, and the source of the MOSFET is connected with the anode of the diode. Note that the diode may be a parasitic diode inside the MOSFET itself. A parasitic diode is also called a body diode.

Note that the switching elements 3a, 3b, 3c, and 3d are not limited to a MOSFET formed of silicon, but may also be a MOSFET formed of a wide bandgap semiconductor such as silicon carbide, gallium nitride, gallium oxide, or diamond.

A wide bandgap semiconductor generally has a higher voltage resistance and a higher heat resistance than a silicon semiconductor. Thus, use of a wide bandgap semiconductor for the switching elements 3a, 3b, 3c, and 3d increases voltage resistance and allowable current density of each of the switching elements, thereby allowing size reduction of the semiconductor module incorporating these switching elements.

The current detector 73 is disposed on the electric wire 16b. The current detector 73 detects a total current Idc, which is the sum of the reactor currents flowing through the respective reactors 4a, 4b, 4c, and 4d. Note that FIG. 1 illustrates a configuration in which the current detector 73 is disposed on the electric wire 16b by way of example, but the configuration is not limited thereto. The current detector 73 may be disposed on the electric wire 16a.

The voltage detector 71 detects an AC voltage vac, which is the output voltage of the AC power supply 1. The voltage detector 72 detects a capacitor voltage Vdc, which is the voltage across the smoothing capacitor 6. The capacitor voltage Vdc is also the output voltage of the converter circuit 10.

The control device 200 includes a processor 200a and a memory 200b. The control device 200 receives a detection value of the total current Idc detected by the current detector 73. The control device 200 receives a detection value of the AC voltage vac detected by the voltage detector 71. The control device 200 receives a detection value of the capacitor voltage Vdc detected by the voltage detector 72.

The control device 200 generates gate signals G3a, G3b, G3c, and G3d on the basis of the total current Idc, the AC voltage vac, and the capacitor voltage Vdc.

The unit converters 100a, 100b, 100c, and 100d each include a gate drive circuit not illustrated. The gate drive circuit of the unit converter 100a generates a drive pulse using the gate signal G3a output from the control device 200, and applies the drive pulse generated, to the gate of the switching element 3a to drive the switching element 3a.

The gate drive circuit of the unit converter 100b generates a drive pulse using the gate signal G3b output from the control device 200, and applies the drive pulse generated, to the gate of the switching element 3b to drive the switching element 3b.

The gate drive circuit of the unit converter 100c generates a drive pulse using the gate signal G3c output from the control device 200, and applies the drive pulse generated, to the gate of the switching element 3c to drive the switching element 3c.

The gate drive circuit of the unit converter 100d generates a drive pulse using the gate signal G3d output from the control device 200, and applies the drive pulse generated, to the gate of the switching element 3d to drive the switching element 3d.

A specific operation of the control device 200 will be described later. Note that the detection value of the AC voltage vac detected by the voltage detector 71, among the detection values input to the control device 200, is used for reduction of distortion of a current flowing through the converter circuit 10. Therefore, the fundamental operation of the converter circuit 10 can be controlled without including the voltage detector 71.

In the control device 200, the processor 200a is computing means such as a computing unit, a microprocessor, a microcomputer, a central processing unit (CPU), or a digital signal processor (DSP). The memory 200b is a non-volatile or volatile semiconductor memory such as a random access memory (RAM), a read-only memory (ROM), a flash memory, an erasable programmable ROM (EPROM), or an electrically EPROM (EEPROM) (registered trademark).

The memory 200b stores programs for performing the functionality of the control device 200 described above and functionality of the control device 200 described later. The processor 200a provides and receives needed information via an interface including an analog-to-digital converter and a digital-to-analog converter (both not illustrated), and the processor 200a executes a program stored in the memory 200b to perform necessary processing. A result of computation by the processor 200a is stored in the memory 200b.

When one of the switching elements 3a, 3b, 3c, and 3d is controlled and performs a switching operation, power supplied from the AC power supply 1 is stored in the corresponding reactor. The control device 200 performs control of causing the switching elements 3a, 3b, 3c, and 3d to perform switching operation at a predetermined duty so that the voltage output from the converter circuit 10 is a desired voltage.

A difference that may occur between the reactor currents of a pair of phases during operation of the power conversion apparatus 120 according to the first embodiment will next be described. A difference between the reactor currents of a pair of phases will be referred to hereinafter as "current difference".

Figure 2:
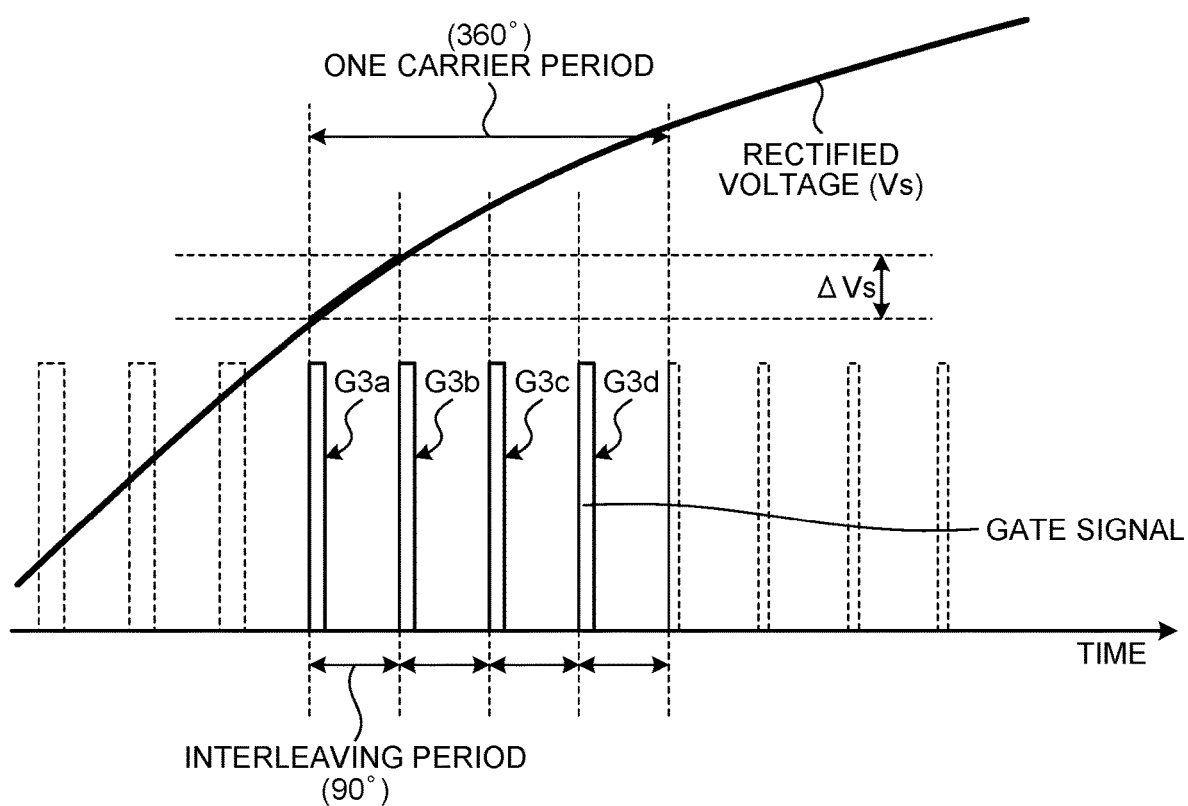
FIG. 2 is a waveform chart for use in describing an operation of the power conversion apparatus according to the first embodiment.

FIG. 2 is a waveform chart for use in describing an operation of the power conversion apparatus 120 according to the first embodiment. The horizontal axis represents time.

In FIG. 2, the waveform represented by the bold line represents a rectified voltage Vs. The rectified voltage Vs is the output voltage from the rectification circuit 20, and is also the voltage applied to the unit converters 100a, 100b, 100c, and 100d. The four pulses represented by the solid lines represent the gate signals in a carrier period of interest. Specifically, the four pulses represent, from left to right in the positive direction of the time axis, the gate signal G3a, the gate signal G3b, the gate signal G3c, and the gate signal G3d.

The gate signals G3a, G3b, G3c, and G3d are pulse width modulation (PWM) signals. As compared to these gate signals, the gate signals represented by broken lines in one carrier period before the carrier period of interest each have a pulse width greater than the pulse width of each of the gate signals in the carrier period of interest. In addition, the gate signals represented by broken lines one carrier period after the carrier period of interest each have a pulse width less than the pulse width of each of the gate signals in the carrier period of interest. Moreover, the interval between each pair of adjacent gate signals of the gate signals G3a, G3b, G3c, and G3d corresponds to the interleaving period.

One carrier period is the period of carrier signals. The interleaving period in a power conversion apparatus that performs four-phase interleaving is 90° (=360°/4) when the phase range during one carrier period is 360°. The carrier signals will be described later.

A change in the reactor current flowing through the reactor upon turning on of the switching element in each of the unit converters will next be described. Note that a change in a reactor current is called "current ripple", and the current ripples in the respective unit converters 100a, 100b, 100c, and 100d are respectively denoted by ΔIa, ΔIb, ΔIc, and ΔId. These current ripples ΔIa, ΔIb, ΔIc, and ΔId can be expressed by Equations (1) to (4) below.

$$\Delta Ia = (Vac\_a/La) \cdot Ton\_a \quad (1)$$

$$\Delta Ib = (Vac\_b/Lb) \cdot Ton\_b \quad (2)$$

$$\Delta Ic = (Vac\_c/Lc) \cdot Ton\_c \quad (3)$$

$$\Delta Id = (Vac\_d/Ld) \cdot Ton\_d \quad (4)$$

In Equations (1) to (4) above, La, Lb, Lc, and Ld represent the inductance values of the respective reactors 4a, 4b, 4c, and 4d. In addition, Ton_a, Ton_b, Ton_c, and Ton_d represent the On times upon turning on of the switching elements 3a, 3b, 3c, and 3d. Moreover, Vac_a, Vac_b, Vac_c, and Vac_d represent the instantaneous values of the reactor voltages appearing across the reactors 4a, 4b, 4c, and 4d when the switching elements 3a, 3b, 3c, and 3d are turned on.

Assuming here that the voltage is applied to each of the unit converters for a fixed period of time and that the reactors of the respective unit converters 100a, 100b, 100c, and 100d vary from piece to piece only to a sufficiently low degree, the instantaneous values Vac_a, Vac_b, Vac_c, and Vac_d of the reactor voltages are almost the same. That is, a relationship of Vac_a=Vac_b=Vac_c=Vac_d can be reasonably considered to hold during one carrier period. In this case, use of the same duty factor for the PWM signals for the respective switching elements in one carrier period results in the same current ripple in one carrier period. This then results in the same average current value for the reactors in one carrier period.

On the contrary, the AC power supply 1 of the power conversion apparatus 120 according to the first embodiment is a voltage source having a power supply period; therefore, the voltage applied to each of the unit converters varies over time. FIG. 2 illustrates a situation in which the voltage applied to the unit converter 100b at a time when the switching element 3b of the unit converter 100b is turned on is higher by an amount of ΔVs than the voltage applied to the unit converter 100a at a time when the switching element 3a of the unit converter 100a is turned on.

Thus, when a voltage source having a power supply period is used, driving the switching elements with gate pulses having the same duty value will cause the current ripples of the respective reactor currents to have values different from one another. A difference in the values of the current ripples in one carrier period in turn causes a difference among the average values of the respective reactor currents during one power supply period. In addition, when the inductance values of the respective reactors are not the same as one another, the relationship of Vac_a=Vac_b=Vac_c=Vac_d does not hold, thereby also causing a difference among the average values of the respective reactor currents.

Figure 3:
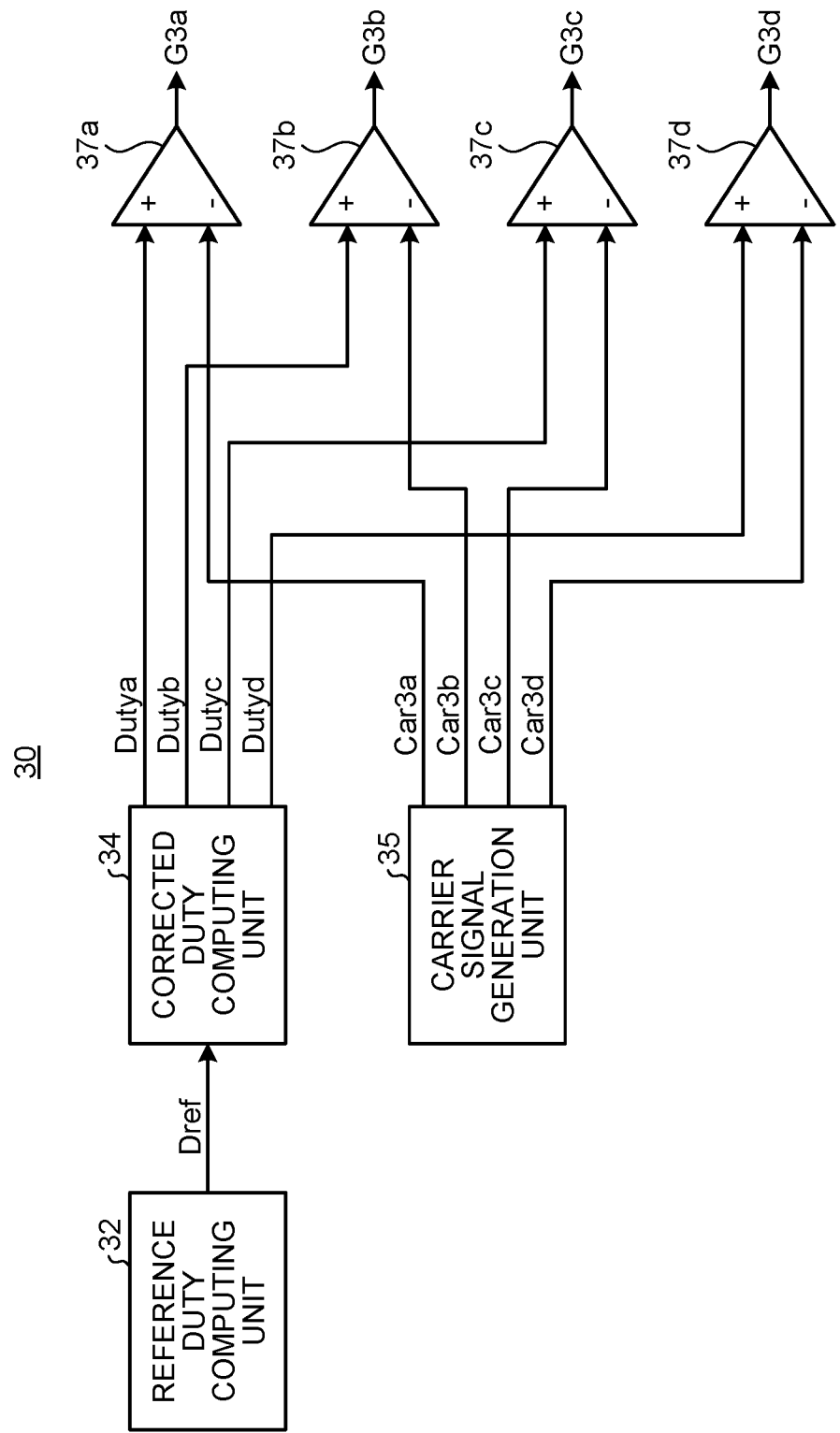
FIG. 3 is a block diagram illustrating an example configuration of a control system included in a control device of the first embodiment.
Figure 4:
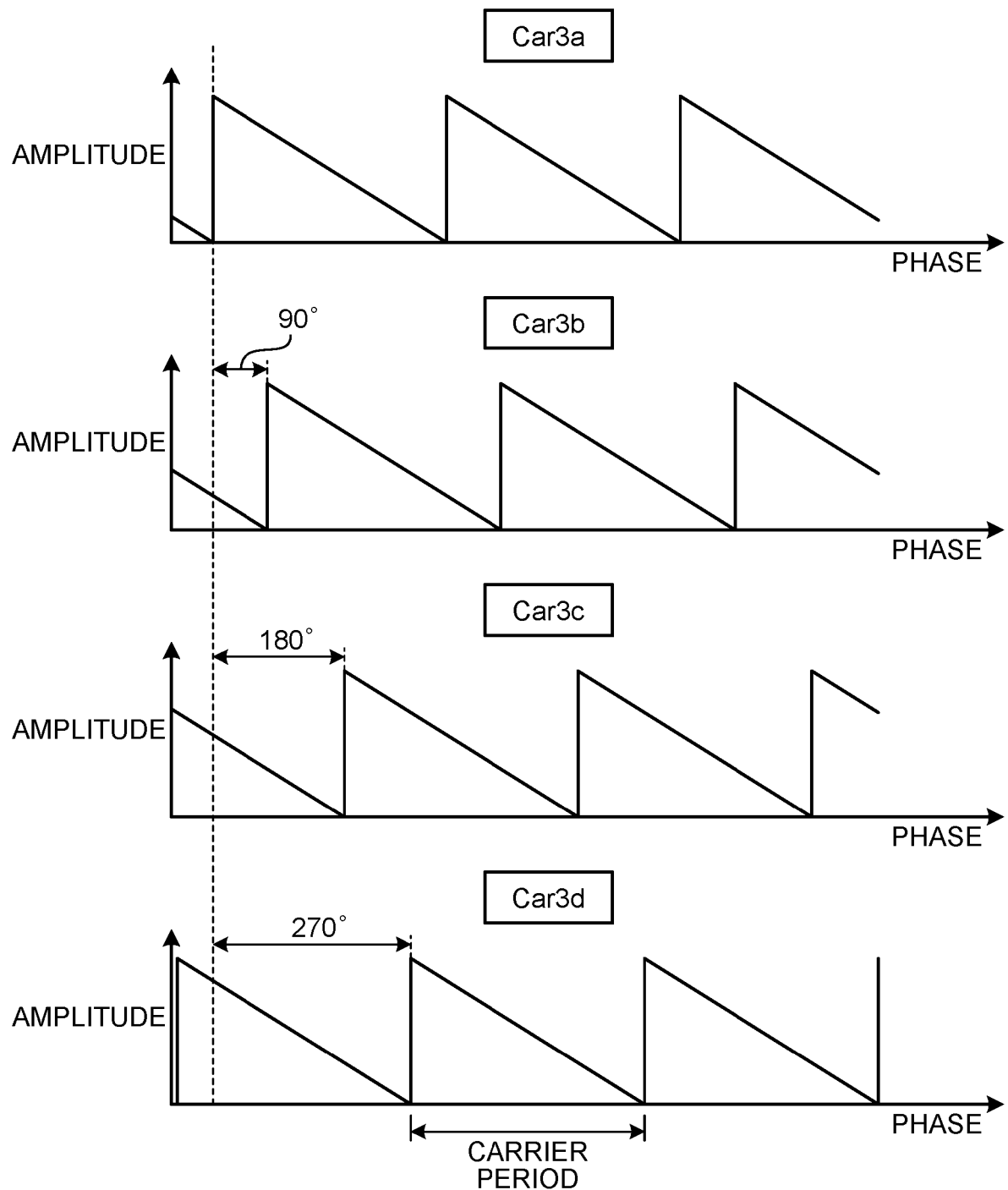
FIG. 4 is a diagram illustrating example waveforms of carrier signals generated in the control system illustrated in FIG. 3.

A control system for reducing the differences among the average values of the respective reactor currents described above will next be described. FIG. 3 is a block diagram illustrating an example configuration of a control system 30 included in the control device 200 of the first embodiment. FIG. 4 is a diagram illustrating example waveforms of the carrier signals generated in the control system 30 illustrated in FIG. 3.

The control system 30 in the first embodiment includes, as illustrated in FIG. 3, a reference duty computing unit 32, a corrected duty computing unit 34, a carrier signal generation unit 35, and comparators 37a, 37b, 37c, and 37d.

In FIG. 3, the reference duty computing unit 32 computes a reference duty Dref. The corrected duty computing unit 34 computes corrected duties Dutya, Dutyb, Dutyc, and Dutyd (hereinafter described as "Dutya to Dutyd" as appropriate) on the basis of the reference duty Dref.

The corrected duty Dutya is input to the terminal "+" of the comparator 37a as a first signal used for generation of the gate signal G3a. The corrected duty Dutyb is input to the terminal "+" of the comparator 37b as a first signal used for generation of the gate signal G3b. The corrected duty Dutyc is input to the terminal "+" of the comparator 37c as a first signal used for generation of the gate signal G3c. The corrected duty Dutyd is input to the terminal "+" of the comparator 37d as a first signal used for generation of the gate signal G3d.

The carrier signal generation unit 35 generates carrier signals Car3a, Car3b, Car3c, and Car3d. The carrier signal Car3a is input to the terminal "−" of the comparator 37a as a second signal used for generation of the gate signal G3a. The carrier signal Car3b is input to the terminal "−" of the comparator 37b as a second signal used for generation of the gate signal G3b. The carrier signal Car3c is input to the terminal "−" of the comparator 37c as a second signal used for generation of the gate signal G3c. The carrier signal Car3d is input to the terminal "−" of the comparator 37d as a second signal used for generation of the gate signal G3d.

FIG. 4 illustrates an example of the carrier signals in four-phase interleaving. In four-phase interleaving, the phase difference between carrier signals is 90°. Accordingly, when phase a is the reference phase, the carrier signal Car3b of phase b has a phase difference of 90° relative to the carrier signal Car3a of phase a. In addition, the carrier signal Car3c of phase c has a phase difference of 180° relative to the carrier signal Car3a of phase a. Moreover, the carrier signal Car3d of phase d has a phase difference of 270° relative to the carrier signal Car3a of phase a.

Note that although FIG. 4 illustrates a case of carrier signals that are inverted sawtooth waves by way of example, the waveform is not limited thereto. The carrier signals may each be a triangular wave or a sawtooth wave.

Returning to the description with reference to FIG. 3, the comparator 37a compares the reference duty Dref and the amplitude value of the carrier signal Car3a, and outputs the result of comparison. As illustrated in FIG. 3, the output of the comparator 37a is the gate signal G3a for the switching element 3a. The other comparators 37b, 37c, and 37d also operate similarly. The output of the comparator 37b is the gate signal G3b for the switching element 3b. In addition, the output of the comparator 37c is the gate signal G3c for the switching element 3c. Moreover, the output of the comparator 37d is the gate signal G3d for the switching element 3d.

Figure 5:
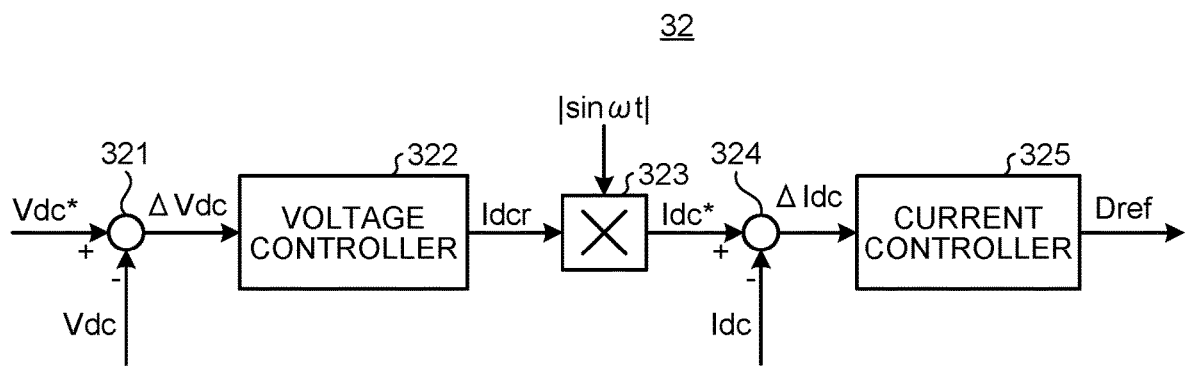
FIG. 5 is a diagram illustrating an example configuration of a reference duty computing unit in the first embodiment.
Figure 6:
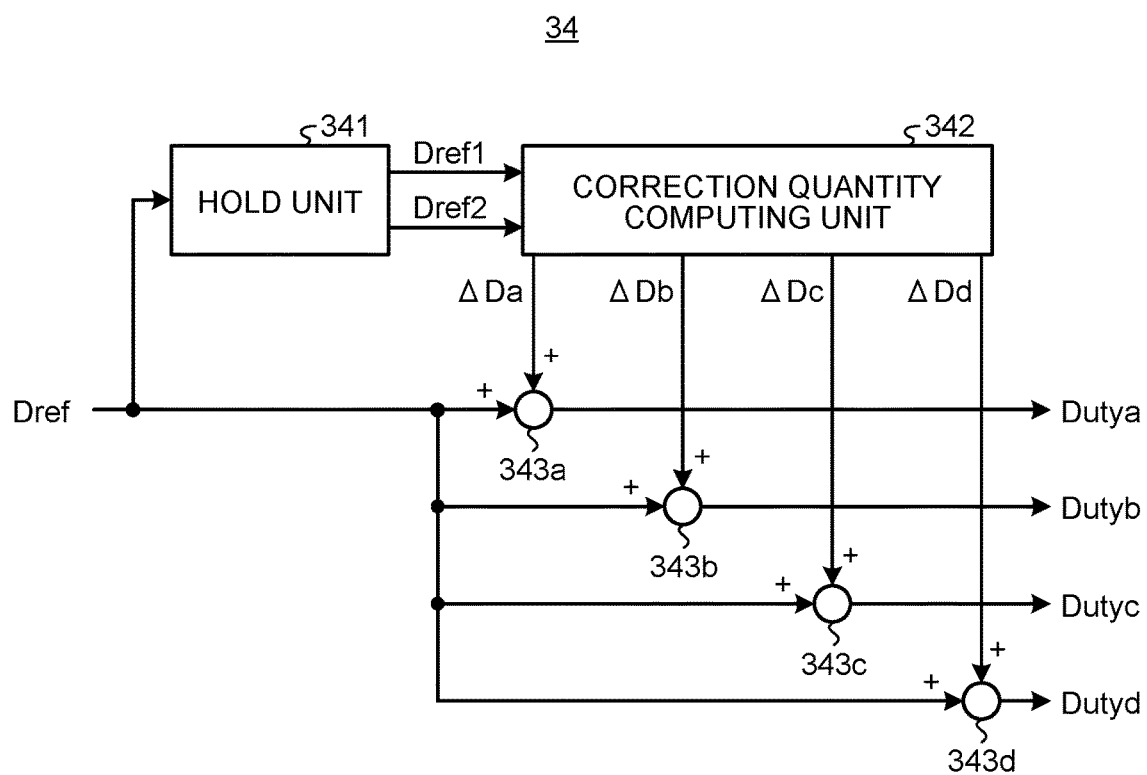
FIG. 6 is a diagram illustrating an example configuration of a corrected duty computing unit in the first embodiment.

Configurations of the reference duty computing unit 32 and of the corrected duty computing unit 34 in the first embodiment will next be described. FIG. 5 is a diagram illustrating an example configuration of the reference duty computing unit 32 in the first embodiment. FIG. 6 is a diagram illustrating an example configuration of the corrected duty computing unit 34 in the first embodiment.

The reference duty computing unit 32 includes, as illustrated in FIG. 5, subtractors 321 and 324, a voltage controller 322, a multiplier 323, and a current controller 325. An example of each of the voltage controller 322 and the current controller 325 is a proportional integral (PI) controller. A case will be described below by way of example in which the voltage controller 322 and the current controller 325 are each a PI controller.

The subtractor 321 computes a deviation ΔVdc between a predetermined command value Vdc* of the capacitor voltage Vdc and the detection value of the capacitor voltage Vdc. The voltage controller 322 provides PI control on the deviation ΔVdc to generate an amplitude command value Idcr for the total current Idc.

The multiplier 323 multiplies the amplitude command value Idcr for the total current Idc by an absolute value |sin ωt| of a sine wave signal having an angular frequency ω (=2πf), where f is the frequency of the AC voltage output by the AC power supply 1, i.e., the power supply frequency. The absolute value |sin ωt| of the sine wave signal is a signal synchronized with the phase of the AC voltage vac, and is generated based on the detection value of the AC voltage vac.

The subtractor 324 computes a deviation ΔIdc between the output of the multiplier 323, i.e., the command value Idc* for the total current Idc, and the total current Idc. The current controller 325 provides PI control on the deviation ΔIdc to generate the reference duty Dref.

In addition, the corrected duty computing unit 34 includes, as illustrated in FIG. 6, a hold unit 341, a correction quantity computing unit 342, and adders 343a, 343b, 343c, and 343d. The hold unit 341 may be configured as a delay filter circuit using a digital filter, or may be configured using the memory 200b of the control device 200 or using an external memory.

The hold unit 341 receives the reference duty Dref. In this regard, the carrier period of interest is referred to as "first carrier period". Of the reference duties Dref received, the hold unit 341 at least holds the reference duty Dref in the first carrier period in one power supply period before, and the reference duty Dref in a second carrier period subsequent to the first carrier period. The reference duty Dref in the first carrier period in one power supply period before is hereinafter denoted by "Dref1". In addition, the reference duty Dref in the second carrier period in one power supply period before is denoted by "Dref2". The reference duty Dref1 and the reference duty Dref2 held by the hold unit 341 are input to the correction quantity computing unit 342.

The correction quantity computing unit 342 computes correction quantities ΔDa, ΔDb, ΔDc, and ΔDd using the reference duties Dref1 and Dref2. The correction quantity ΔDa is the correction quantity for phase a, and is input to the adder 343a. Similarly, the correction quantity ΔDb is the correction quantity for phase b, and is input to the adder 343b. In addition, the correction quantity ΔDc is the correction quantity for phase c, and is input to the adder 343c.

Moreover, the correction quantity ΔDd is the correction quantity for phase d, and is input to the adder 343d.

The adder 343a adds together the reference duty Dref output from the reference duty computing unit 32 and the correction quantity ΔDa for phase a, and outputs the result of addition. The output of the adder 343a is the corrected duty for phase a in the first carrier period. As illustrated in FIG. 6, the corrected duty for phase a is denoted by "Dutya".

The other adders 343b, 343c, and 343d operate similarly. The output of the adder 343b is the corrected duty Dutyb for phase b. In addition, the output of the adder 343c is the corrected duty Dutyc for phase c. Moreover, the output of the adder 343d is the corrected duty Dutyd for phase d.

The specific formulae for calculating the correction quantities ΔDa, ΔDb, ΔDc, and ΔDd can be expressed by Equation (5) below.

$$\Delta Da = 0$$

$$\Delta Db = (Dref2 - Dref1)/n$$

$$\Delta Dc = 2*(Dref2 - Dref1)/n$$

$$\Delta Dd = 3*(Dref2 - Dref1)/n \tag{5}$$

In Equation (5) above, n is the number of interleaved phases.

Using Equation (5) above, the corrected duties Dutya to Dutyd of the respective phases in the first carrier period can be expressed by Equation (6) below.

$$Dutya = Dref$$

$$Dutyb = Dref + (Dref2 - Dref1)/n$$

$$Dutyc = Dref + 2*(Dref2 - Dref1)/n$$

$$Dutyd = Dref + 3*(Dref2 - Dref1)/n \tag{6}$$

Figure 7:
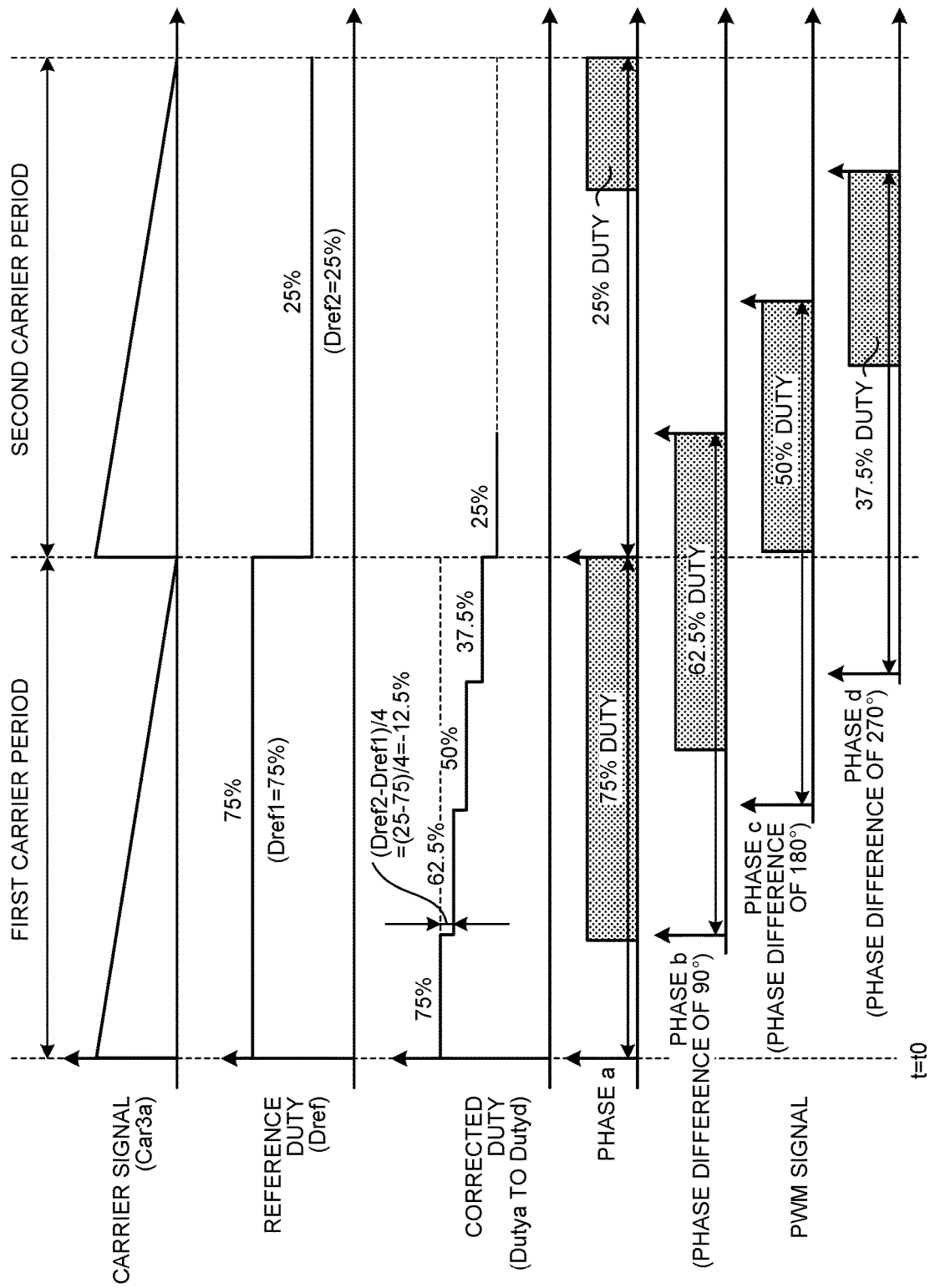
FIG. 7 is a time chart for use in describing a control technique of the first embodiment.

A specific example of operation using a control technique of the first embodiment will next be described with reference to FIG. 7. FIG. 7 is a time chart for use in describing the control technique of the first embodiment. FIG. 7 illustrates, from top to bottom along the vertical axis direction, the carrier signal Car3a of phase a, the reference duty Dref, the corrected duties Dutya to Dutyd, and the PWM signals. Note that FIG. 7 provides the values of the reference duty Dref and of the corrected duties Dutya to Dutyd each in a duty factor, which is the ratio of the reference duty relative to the maximum value.

A supplementary explanation thereof will be given below. To avoid complexity, the top portion illustrates only the waveform of the carrier signal Car3a of phase a, which is the reference phase. The indications of Dref1=75% and Dref2=25% for the waveform in the middle upper portion are the reference duties Dref in one power supply period before. It is assumed here that the value of the reference duty Dref in the current power supply period and the value of the reference duty Dref in one power supply period before are the same as each other. The values of Dref1 and of Dref2 are held in the hold unit 341. The time t=t0 is the time of the rising edge of the carrier signal Car3a of phase a, which is the reference phase. The total current Idc needs to be detected no later than the time t=t0, that is, before the first carrier period starts. Note that the reference phase does not necessarily need to be phase a, but phase b, phase c, or phase d may instead be the reference phase.

Substitution of the values of Dref1=75% and Dref2=25% in Equation (6) above yields Dutya=75%, Dutyb=62.5%, Dutyc=50%, and Dutyd=37.5%. In addition, the corrected duty of phase a in the second carrier period, which is the next period, is the reference duty Dref, and therefore Dutya=25%. From these computation results, the PWM signals have the waveforms illustrated in the bottom portion of FIG. 7.

The unit converters of the converter circuit 10 are controlled on the basis of the PWM signals of FIG. 7, and the On time of each of the switching elements is thus controlled in each carrier period. Accordingly, reduction can be achieved in the differences among current ripples of the reactor currents in the respective unit converters in one carrier period. This enables the differences among the average values of the respective reactor currents to be reduced in one power supply period. Thus, the reactor currents can be equalized.

Figure 8:
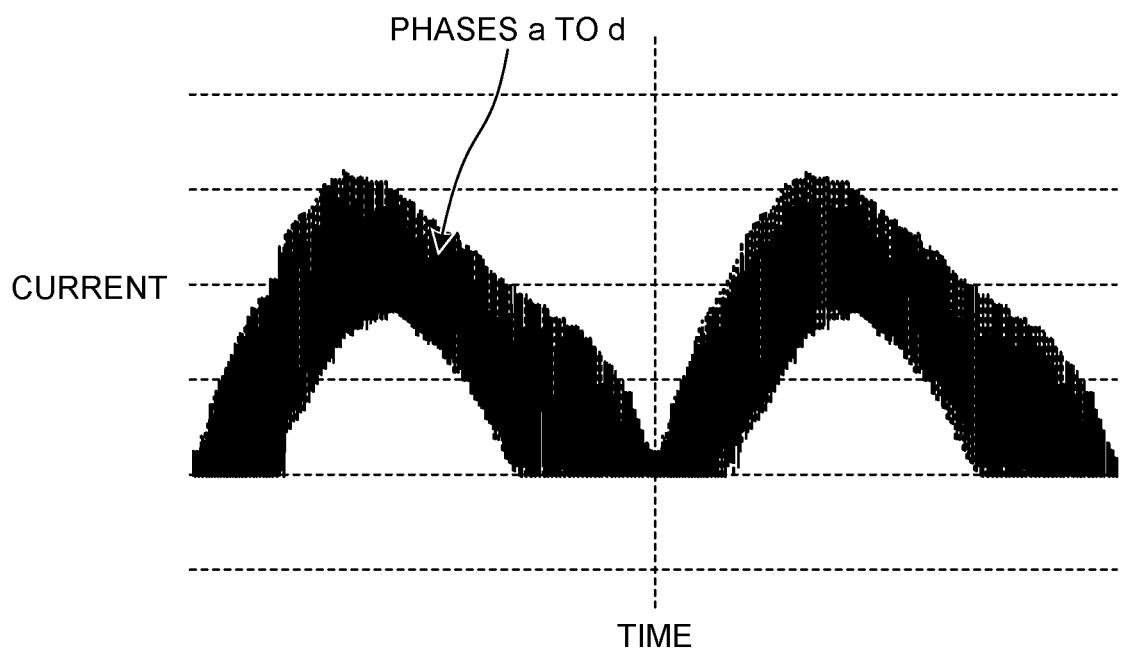
FIG. 8 is a diagram for use in describing an advantage of the power conversion apparatus according to the first embodiment.
Figure 9:
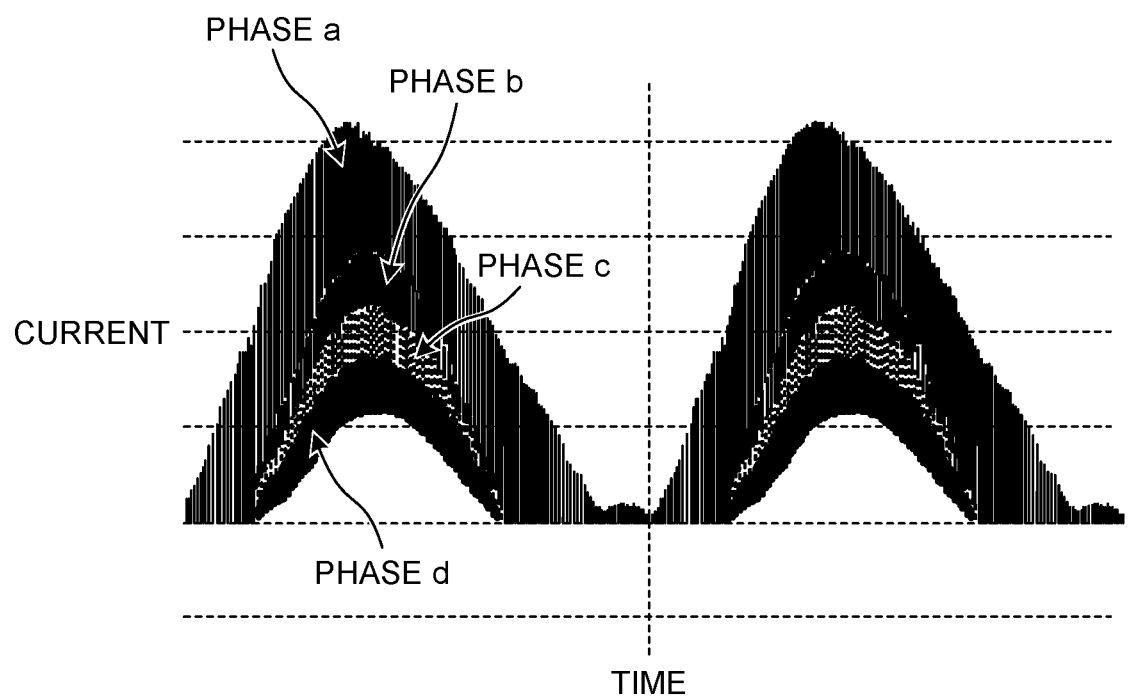
FIG. 9 is a comparative diagram for use in describing the advantage of the power conversion apparatus according to the first embodiment.

FIG. 8 is a diagram for use in describing an advantage of the power conversion apparatus 120 according to the first embodiment. FIG. 9 is a comparative diagram for use in describing the advantage of the power conversion apparatus 120 according to the first embodiment. The diagrams illustrated in FIGS. 8 and 9 both illustrate a result of numerical simulation. Specifically, FIG. 8 illustrates a simulation result when the foregoing correction control has been performed, while FIG. 9 illustrates a simulation result when the foregoing correction control has not been performed.

When no correction control is performed, a large difference occurs as illustrated in FIG. 9 particularly between the reactor current of phase a and the reactor current of phase d. In contrast, when correction control is performed, no large differences occur among the reactor currents of the respective phases as illustrated in FIG. 8. That is, FIGS. 8 and 9 together indicate that the correction control of the first embodiment equalizes, or reduces the difference between, the reactor currents among the multiple unit converters.

Some variations in the control technique of the first embodiment will next be described. A first variation in the control technique of the first embodiment will first be described. Note that the first variation is implemented without a change in the configuration, and the configurations illustrated in FIGS. 3, 5, and 6 are used.

In the first variation, the correction quantities ΔDa, ΔDb, ΔDc, and ΔDd are computed using Equation (7) below.

$$\Delta Da = (Dref2 - Dref1)/n$$

$$\Delta Db = 2*(Dref2 - Dref1)/n$$

$$\Delta Dc = 3*(Dref2 - Dref1)/n$$

$$\Delta Dd = 4*(Dref2 - Dref1)/n \tag{7}$$

Using Equation (7) above, the corrected duties Dutya to Dutyd of the respective phases in the first carrier period can be expressed by Equation (8) below.

$$Dutya = Dref + (Dref2 - Dref1)/n$$

$$Dutyb = Dref + 2*(Dref2 - Dref1)/n$$

$$Dutyc = Dref + 3*(Dref2 - Dref1)/n$$

$$Dutyd = Dref + 4*(Dref2 - Dref1)/n \tag{8}$$

Specific differences will be described below using the example of FIG. 7. That is, an example is used in which the reference duty Dref1 in the first carrier period in one power supply period before is "75%", and the reference duty Dref2 in the second carrier period subsequent to the first carrier period in one power supply period before is "25%". Use of Equation (6) above yields Dutya=75%, Dutyb=62.5%, Dutyc=50%, and Dutyd=37.5%. Meanwhile, use of Equation (8) above yields Dutya=62.5%, Dutyb=50%, Dutyc=37.5%, and Dutyd=25%. That is, the first variation differs in that the duty of phase a, which is the reference phase, is corrected.

Note that the first variation requires the duty of phase a to be corrected immediately after detection of the total current Idc at time t=t0, which is the time of the rising edge of the carrier signal Car3a of phase a, which is the reference phase. This demands a higher speed of processing in the correction control. Thus, whether to use the calculation formulae of Equation (6) or the calculation formulae of Equation (8) can be determined on the basis of the performance of the processor 200a.

A second variation in the control technique of the first embodiment will next be described. Note that the second variation is implemented without a change in the configuration, and the configurations illustrated in FIGS. 3, 5, and 6 are used.

In the second variation, the correction quantities $\Delta Da$, $\Delta Db$, $\Delta Dc$, and $\Delta Dd$ are computed using Equation (9) below.

$\Delta Da = (Dref2 - Dref1)/(n+1)$ $\Delta Db = 2*(Dref2 - Dref1)/(n+1)$ $\Delta Dc = 3*(Dref2 - Dref1)/(n+1)$ $\Delta Dd = 4*(Dref2 - Dref1)/(n+1)$ \hfill (9)

Using Equation (9) above, the corrected duties Dutya to Dutyd of the respective phases in the first carrier period can be expressed by Equation (10) below.

$Dutya = Dref + (Dref2 - Dref1)/(n+1)$ $Dutyb = Dref + 2*(Dref2 - Dref1)/(n+1)$ $Dutyc = Dref + 3*(Dref2 - Dref1)/(n+1)$ $Dutyd = Dref + 4*(Dref2 - Dref1)/(n+1)$ \hfill (10)

Specific differences will be described below using the example of FIG. 7. That is, an example is used in which the reference duty Dref1 in the first carrier period in one power supply period before is "75%", and the reference duty Dref2 in the second carrier period subsequent to the first carrier period in one power supply period before is "25%". Use of Equation (6) above yields Dutya=75%, Dutyb=62.5%, Dutyc=50%, and Dutyd=37.5%. Meanwhile, use of Equation (10) above yields Dutya=65%, Dutyb=55%, Dutyc=45%, and Dutyd=35%. That is, the second variation is the same as the first variation in that the duty of phase a, which is the reference phase, is corrected, but differs from the first variation in use of a smaller correction step size between phases. The second variation also requires the duty of phase a to be corrected immediately after detection of the total current Idc at time t=t0, which is the time of the rising edge of the carrier signal Car3a of phase a, which is the reference phase. Accordingly, whether to employ the second variation or not can be determined on the basis of the performance of the processor 200a.

Figure 10:
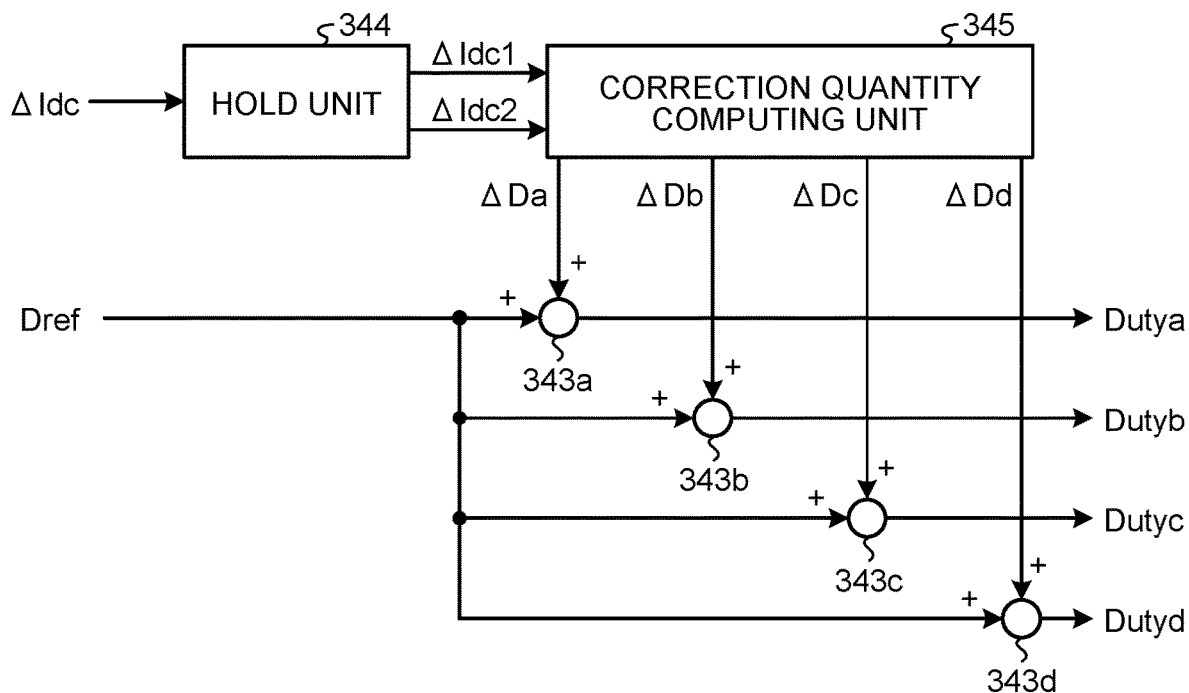
FIG. 10 is a diagram illustrating an example configuration of a corrected duty computing unit according to a third variation of the first embodiment.

A third variation in the control technique of the first embodiment will next be described. FIG. 10 is a diagram illustrating an example configuration of a corrected duty computing unit 34A according to the third variation of the first embodiment. The corrected duty computing unit 34A illustrated in FIG. 10 has a configuration different from the configuration of the corrected duty computing unit 34 illustrated in FIG. 6 in including a hold unit 344 in place of the hold unit 341 and a correction quantity computing unit 345 in place of the correction quantity computing unit 342. The input signal to the hold unit 344 is the deviation $\Delta Idc$ instead of the reference duty Dref. The other part of the configuration is the same as or equivalent to the corresponding part of the configuration of FIG. 6. The same or equivalent components are designated by like reference characters, and duplicate description will be omitted.

In FIG. 10, of the deviations $\Delta Idc$ received, the hold unit 344 at least holds the deviation $\Delta Idc$ in the first carrier period in one power supply period before, and the deviation $\Delta Idc$ in a second carrier period subsequent to the first carrier period. The deviation $\Delta Idc$ in the first carrier period in one power supply period before is hereinafter denoted by "$\Delta Idc1$", and is referred to as "first deviation". In addition, the deviation $\Delta Idc$ in the second carrier period in one power supply period before is denoted by "$\Delta Idc2$", and is referred to as "second deviation". The first deviation $\Delta Idc$ 1 and the second deviation $\Delta Idc$ 2 held by the hold unit 344 are input to the correction quantity computing unit 345.

The correction quantity computing unit 345 computes the correction quantities $\Delta Da$, $\Delta Db$, $\Delta Dc$, and $\Delta Dd$ using the first deviation $\Delta Idc$ 1 and the second deviation $\Delta Idc$ 2. The specific formulae for calculating the correction quantities $\Delta Da$, $\Delta Db$, $\Delta Dc$, and $\Delta Dd$ can be expressed by Equation (11) below.

$\Delta Da = 0$ $\Delta Db = \gamma a * (\Delta Idc2 - \Delta Idc1)/n$ $\Delta Dc = \gamma b * (\Delta Idc2 - \Delta Idc1)/n$ $\Delta Dd = \gamma c * (\Delta Idc2 - \Delta Idc1)/n$ \hfill (11)

In Equation (11) above, $\gamma a$, $\gamma b$, and $\gamma c$ are gain values.

Using Equation (11) above, the corrected duties Dutya to Dutyd of the respective phases in the first carrier period can be expressed by Equation (12) below.

$Dutya = Dref$ $Dutyb = Dref + \gamma a * (\Delta Idc2 - \Delta Idc1)/n$ $Dutyc = Dref + \gamma b * (\Delta Idc2 - \Delta Idc1)/n$ $Dutyd = Dref + \gamma c * (\Delta Idc2 - \Delta Idc1)/n$ \hfill (12)

Note that instead of using the example that uses Equation (12) above, the duty of phase a, which is the reference phase, may be corrected as performed in the first variation. Alternatively, as performed in the second variation, the correction may be performed such that the duty of phase a, which is the reference phase, is corrected, and the duties of the respective phases are corrected such that a correction step size between phases is small.

Figure 11:
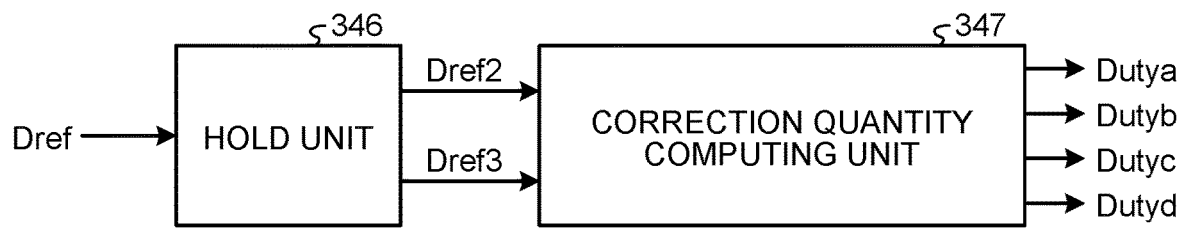
FIG. 11 is a diagram illustrating an example configuration of a corrected duty computing unit according to a fourth variation of the first embodiment.

A fourth variation in the control technique of the first embodiment will next be described. FIG. 11 is a diagram illustrating an example configuration of a corrected duty computing unit 34B according to the fourth variation of the first embodiment. The corrected duty computing unit 34B illustrated in FIG. 11 has a configuration different from the configuration of the corrected duty computing unit 34 illustrated in FIG. 6 in including a hold unit 346 in place of the hold unit 341 and a correction quantity computing unit 347 in place of a set of the correction quantity computing unit 342 and the adders 343a, 343b, 343c, and 343d. The correction quantity computing unit 347 is a component that computes the correction quantities $\Delta Da$, $\Delta Db$, $\Delta Dc$, and $\Delta Dd$ and generates the corrected duties Dutya to Dutyd.

In FIG. 11, of the reference duties Dref received, the hold unit 346 at least holds the reference duty Dref in the second carrier period subsequent to the first carrier period in one power supply period before, and the reference duty Dref in a third carrier period subsequent to the second carrier period. The reference duty Dref in the second carrier period in one power supply period before is hereinafter denoted by "Dref2". In addition, the reference duty Dref in the third carrier period in one power supply period before is denoted by "Dref3". The reference duties Dref2 and Dref3 held by the hold unit 346 are input to the correction quantity computing unit 347.

The correction quantity computing unit 347 computes the correction quantities ΔDa, ΔDb, ΔDc, and ΔDd using the reference duties Dref2 and Dref3. In addition, the correction quantity computing unit 347 generates the corrected duties Dutya to Dutyd using the reference duties Dref2 and Dref3 and using the correction quantities ΔDa, ΔDb, ΔDc, and ΔDd.

The specific formulae for calculating the correction quantities ΔDa, ΔDb, ΔDc, and ΔDd can be expressed by Equation (13) below.

$$\Delta Da=0$$

$$\Delta Db=(Dref3-Dref2)/n$$

$$\Delta Dc=2*(Dref3-Dref2)/n$$

$$\Delta Dd=3*(Dref3-Dref2)/n \quad (13)$$

In addition, using Equation (13) above, the corrected duties Dutya to Dutyd of the respective phases in the first carrier period can be expressed by Equation (14) below.

$$Dutya=Dref2$$

$$Dutyb=Dref2+(Dref3-Dref2)/n$$

$$Dutyc=Dref2+2*(Dref3-Dref2)/n$$

$$Dutyd=Dref2+3*(Dref3-Dref2)/n \quad (14)$$

Figure 12:
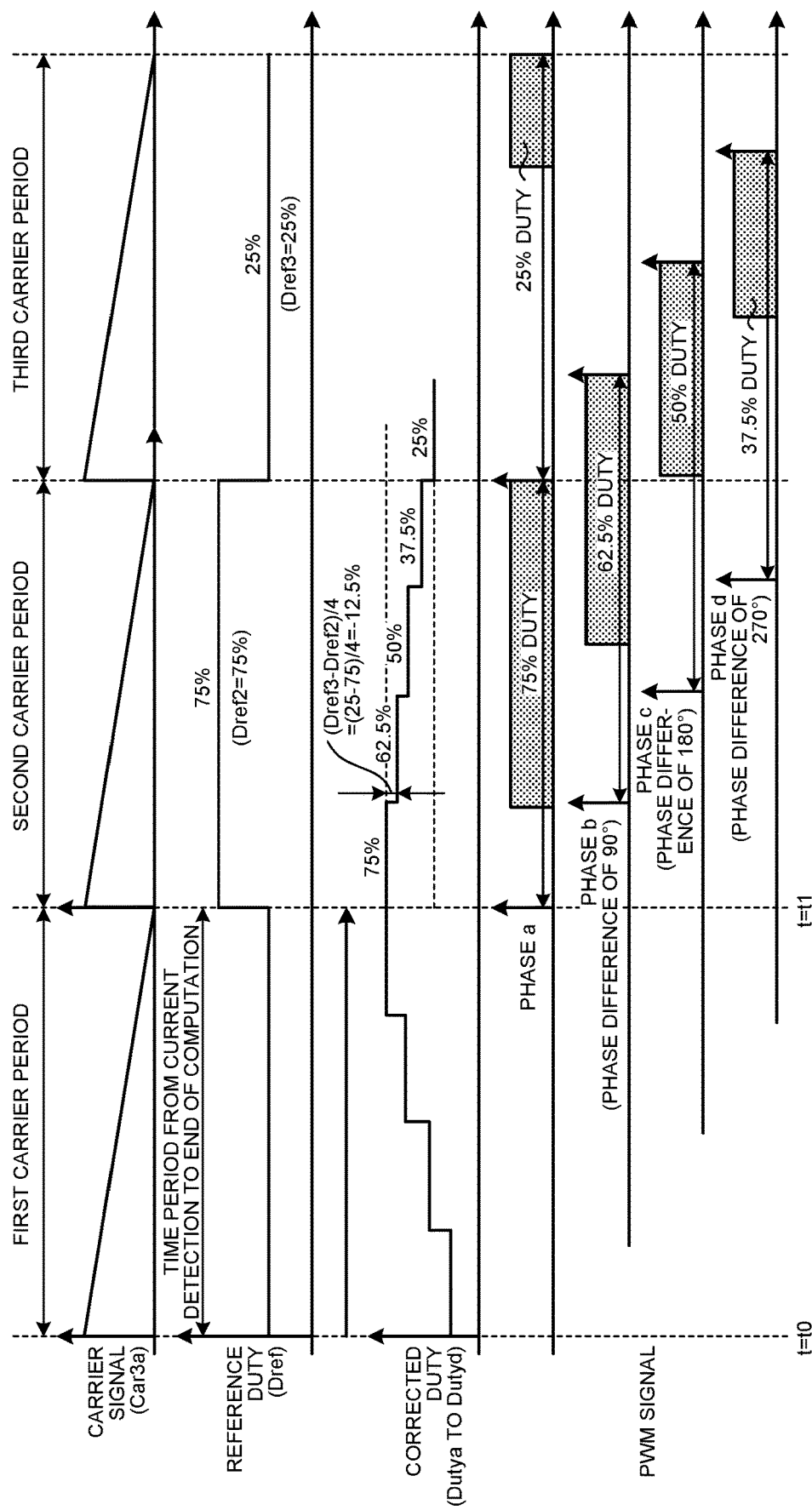
FIG. 12 is a time chart for use in describing a control technique according to the fourth variation of the first embodiment.

A specific example of operation according to the fourth variation of the first embodiment will next be described with reference to FIG. 12. FIG. 12 is a time chart for use in describing a control technique according to the fourth variation of the first embodiment. FIG. 12 illustrates, from top to bottom along the vertical axis direction, the carrier signal Car3a of phase a, the reference duty Dref, the corrected duties Dutya to Dutyd, and the PWM signals.

A supplementary explanation thereof will be given below. The indications of Dref2=75% and Dref3=25% for the waveform in the middle upper portion are the reference duties Dref in one power supply period before. It is assumed here that the value of the reference duty Dref in the current power supply period and the value of the reference duty Dref in one power supply period before are the same as each other. The values of Dref2 and of Dref3 are held in the hold unit 346. The time t=t0 is the time of the rising edge of the carrier signal Car3a in the first carrier period in phase a, which is the reference phase, and is also the limit of the time for detecting the total current Idc. That is, the total current Idc needs to be detected before the first carrier period starts. Note that the reference phase does not necessarily need to be phase a, but phase b, phase c, or phase d may instead be the reference phase.

The time t=t0 is also the start time of computation of the corrected duties Dutya to Dutyd. In addition, a time t=t1 is the end time of the computation of the corrected duties Dutya to Dutyd. That is, computation of the corrected duties Dutya to Dutyd is expected to be performed during a time period from time t=t0 to time t=t1.

Substitution of the values of Dref2=75% and Dref3=25% in Equation (14) above yields Dutya=75%, Dutyb=62.5%, Dutyc=50%, and Dutyd=37.5%. In addition, the corrected duty of phase a in the third carrier period subsequent to the second carrier period is Dutya=25%. From these computation results, the PWM signals have the waveforms illustrated in the bottom portion of FIG. 12.

The fourth variation eliminates the need to correct the reference duty Dref in the carrier period immediately after detection of the total current Idc, on the basis of the detection value of that total current Idc. In addition, the computation results can be reflected in a time period that is two carrier periods after the carrier period in which the total current Idc is detected. This reduces the demand for the speed of processing in the correction control relative to those of the first embodiment and of the other variations of the first embodiment. In any of these cases, whether to use the fourth variation or not can be determined on the basis of the performance of the processor 200a.

Note that the foregoing description of the operations has been provided with respect to a technique of computation of the corrected duties Dutya to Dutyd in the current power supply period based on the reference duty Dref of one power supply period before. The foregoing description is also applicable to a case of computation of the corrected duties Dutya to Dutyd in one power supply period after, on the basis of the reference duty Dref of the current power supply period, specific description of which follows below.

For example, the values of Dref1=75% and of Dref2=25% indicated in the middle upper portion in FIG. 7 will correspondingly indicate the reference duties Dref in the current power supply period. In addition, the values of the corrected duties Dutya to Dutyd indicated in the middle lower portion will correspondingly indicate the values of the corrected duties Dutya to Dutyd in one power supply period after. Similar explanation is also applicable to FIG. 12.

A main point of the power conversion apparatus according to the first embodiment is that when the first reference duty in the first carrier period differs from the second reference duty in the second carrier period subsequent to the first carrier period, the first corrected duty and the second corrected duty are controlled to have different values from each other. As used herein, the term "first corrected duty" refers to the corrected duty of a first phase in the first carrier period in one power supply period after. In addition, the term "second corrected duty" refers to the corrected duty of a second phase in the first carrier period in one power supply period after. In addition, as used herein, the terms "first phase" and "second phase" do not necessarily refer to phases adjacent to each other. Note that the description stating that "the first corrected duty and the second corrected duty are controlled to have different values from each other" is not intended to exclude a situation in which the correction processing happens to cause the first corrected duty and the second corrected duty to have the same value as each other.

In addition, the foregoing phrase of "the first reference duty in the first carrier period" corresponds to "Dref1" in the case of FIG. 7, and "Dref2" in the case of FIG. 12. Similarly, the phrase of "the second reference duty in the second carrier period" corresponds to "Dref2" in the case of FIG. 7, and "Dref3" in the case of FIG. 12. The "first corrected duty" corresponds to one corrected duty among the corrected duties Dutya to Dutyd in the first carrier period in the case of FIG. 7, and to one corrected duty among the corrected duties Dutya to Dutyd in the second carrier period in the case of FIG. 12. In addition, the "second corrected duty" corresponds to, in the case of FIG. 7, the corrected duty of a phase different from the phase of the first corrected duty in the second carrier period, and in the case of FIG. 12, the corrected duty of a phase different from the phase of the first corrected duty in the third carrier period.

As described above, in the power conversion apparatus according to the first embodiment, the first corrected duty and the second corrected duty are controlled to have different values from each other when the first reference duty in the first carrier period differs from the second reference duty in the second carrier period subsequent to the first carrier period. This control operation reduces the current differences among the phases in the respective unit converter circuits. This enables the reactor currents to be equalized among the multiple unit converters. Equalization of the reactor currents can in turn avoid a situation where a specific reactor heats to a high temperature. This can avoid an increase in size of the reactors.

In addition, the power conversion apparatus according to the first embodiment is capable of performing correction control on the basis of a total current, which is the sum of the reactor currents of the respective phases, without individual detection of the reactor currents of the respective phases. This enables a configuration having one current detector to be used, and can thus prevent an increase in the number of current detectors even when the number of interleaved phases increases. As described above, the power conversion apparatus according to the first embodiment is capable of equalizing the reactor currents while reducing an increase in manufacturing cost.

Second Embodiment

Figure 13:
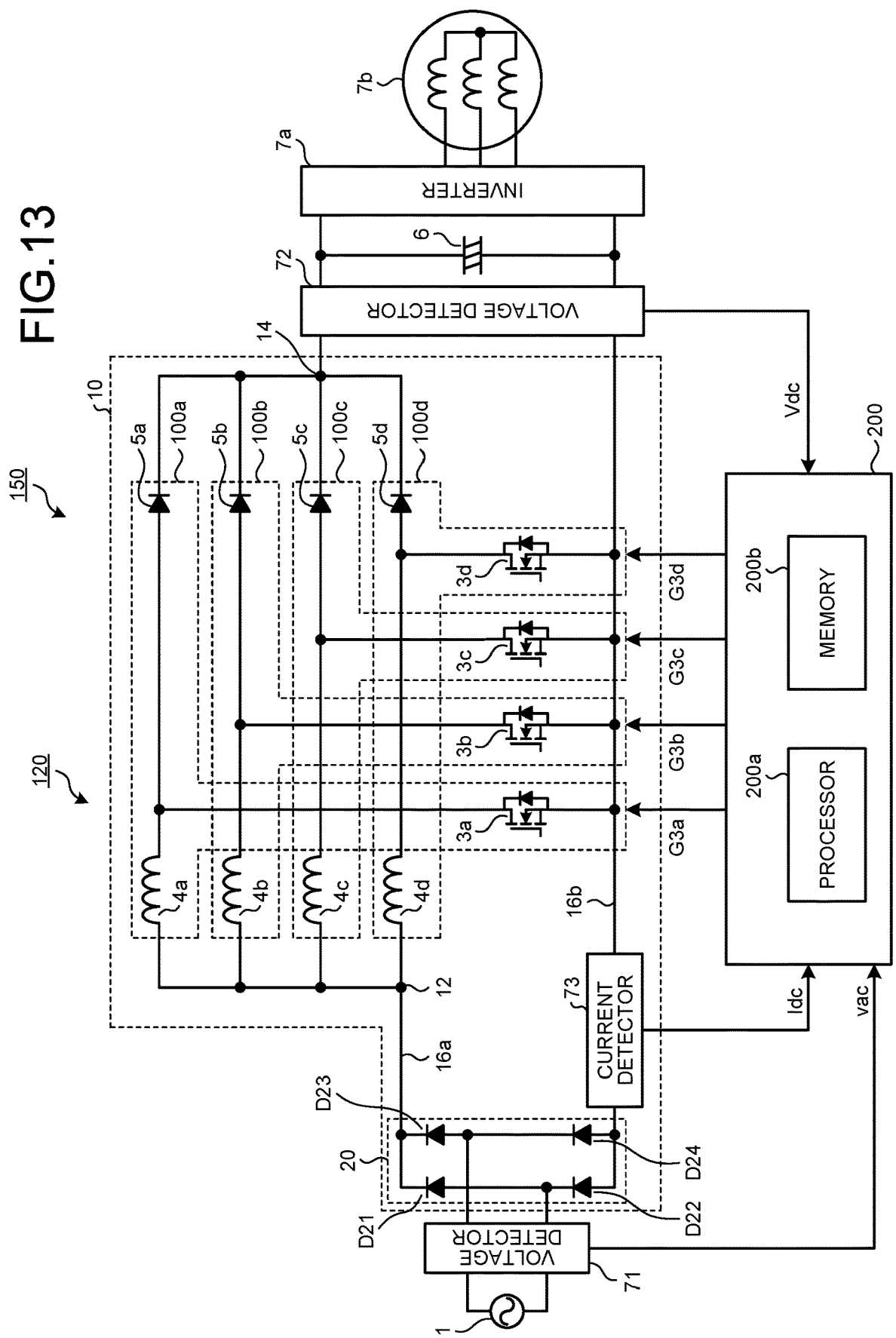
FIG. 13 is a diagram illustrating an example configuration of a motor drive apparatus according to a second embodiment.

The description of a second embodiment will deal with an example application of the power conversion apparatus 120 described in the first embodiment, to a motor drive apparatus. FIG. 13 is a diagram illustrating an example configuration of a motor drive apparatus 150 according to the second embodiment. The motor drive apparatus 150 according to the second embodiment illustrated in FIG. 13 includes an inverter 7a and a motor 7b in addition to the elements of the power conversion apparatus 120 illustrated in FIG. 1.

The output of the inverter 7a is connected to the motor 7b. The motor 7b is an example of a load device. The inverter 7a converts DC power stored in the smoothing capacitor 6 into AC power, and supplies the AC power obtained by the conversion to the motor 7b for driving of the motor 7b. The motor drive apparatus 150 illustrated in FIG. 13 is applicable to products such as a blower, a compressor, and an air conditioner.

Figure 14:
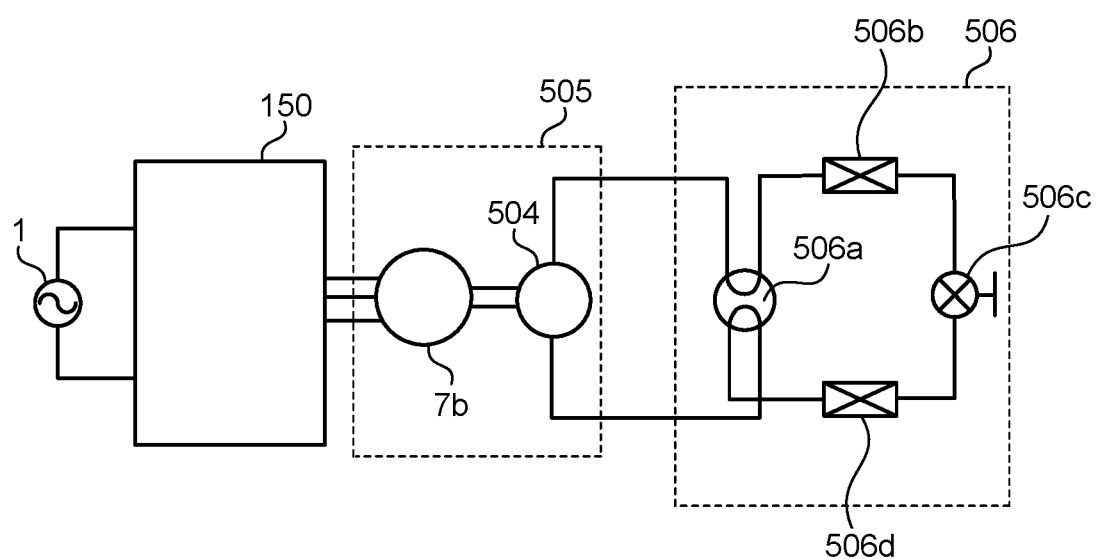
FIG. 14 is a diagram illustrating an example of use of the motor drive apparatus illustrated in FIG. 13 in an air conditioner.

FIG. 14 is a diagram illustrating an example of use of the motor drive apparatus 150 illustrated in FIG. 13 in an air conditioner. The output of the motor drive apparatus 150 is connected to the motor 7b, and the motor 7b is coupled to a compression element 504. The motor 7b and the compression element 504 are included in a compressor 505. A refrigeration cycle unit 506 is configured to include a four-way valve 506a, an indoor heat exchanger 506b, an expansion valve 506c, and an outdoor heat exchanger 506d.

The flow channel of a refrigerant that circulates in the air conditioner is configured to start from the compression element 504, pass through the four-way valve 506a, the indoor heat exchanger 506b, the expansion valve 506c, and the outdoor heat exchanger 506d, and again through the four-way valve 506a, and then return to the compression element 504. The motor drive apparatus 150 is supplied with electric power from the AC power supply 1, and rotates the motor 7b. The rotation of the motor 7b causes the compression element 504 to compress the refrigerant and thus to allow the refrigerant to circulate in the refrigeration cycle unit 506.

The motor drive apparatus 150 according to the second embodiment is configured to include the power conversion apparatuses 120 according to the first embodiment. This enables products such as a blower, a compressor, and an air conditioner including the motor drive apparatus 150 according to the second embodiment to provide advantages described in the first embodiment.

Note that the configurations described in the foregoing embodiments are merely examples of various aspects of the present invention. These configurations may be combined with a known other technology, and moreover, a part of such configurations may be omitted and/or modified without departing from the spirit of the present invention.

The invention claimed is:

1. A power conversion apparatus comprising:
   a converter circuit comprising unit converters corresponding to a respective plurality of phases and converting an alternating current voltage output from an alternating current power supply into a direct current voltage, the unit converters each comprising a reactor and at least one switching element;
   a current detector detecting a sum of currents flowing through the reactors;
   a voltage detector detecting an output voltage of the converter circuit; and
   a control device generating a reference duty on a basis of detection values detected by the current detector and by the voltage detector, and generating a pulse width modulation signal for controlling the switching element on a basis of a result of comparison between a corrected duty and a carrier signal, the corrected duty being obtained by correcting the reference duty, wherein
   a carrier period is shorter than a power supply period, the carrier period being a period of the carrier signal and the power supply period being a period of the alternating current voltage,
   when a first reference duty in a first carrier period differs from a second reference duty in a second carrier period subsequent to the first carrier period, a first corrected duty and a second corrected duty are controlled to have different values from each other,
   the first corrected duty is a corrected duty of a first phase in a first carrier period in one power supply period after, and
   the second corrected duty is a corrected duty of a second phase in the first carrier period in the one power supply period after.

2. The power conversion apparatus according to claim 1, wherein
   the detection value of the current detector used for generation of the first and second corrected duties is detected before a start of the first carrier period in the one power supply period after.

3. The power conversion apparatus according to claim 1, wherein
   the detection value of the current detector used for generation of the first and second corrected duties is detected before a start of a carrier period that is one carrier period before the first carrier period in the one power supply period after.

4. The power conversion apparatus according to claim 1, wherein
the control device holds the first and second reference duties, and generates the first and second corrected duties on a basis of the first and second reference duties and of the number of the phases.

5. The power conversion apparatus according to claim 4, wherein
the control device does not correct the reference duty of a reference phase, but corrects the reference duty of a phase other than the reference phase.

6. The power conversion apparatus according to claim 4, wherein
the control device corrects both the reference duty of a reference phase and the reference duty of a phase other than the reference phase.

7. The power conversion apparatus according to claim 1, wherein
when the first phase and the second phase are phases adjacent to each other, a difference between the first corrected duty and the second corrected duty is equivalent to a value obtained by dividing a difference between the first reference duty and the second reference duty by the number of the phases.

8. The power conversion apparatus according to claim 1, wherein
when the first phase and the second phase are phases adjacent to each other, a difference between the first corrected duty and the second corrected duty is equivalent to a value obtained by dividing a difference between the first reference duty and the second reference duty by a number obtained by addition of 1 to the number of the phases.

9. The power conversion apparatus according to claim 1, wherein
a plurality of the switching elements are formed of a wide bandgap semiconductor.

10. The power conversion apparatus according to claim 9, wherein
the wide bandgap semiconductor is silicon carbide, gallium nitride, gallium oxide, or diamond.

11. A motor drive apparatus comprising:
the power conversion apparatus according to claim 1; and
an inverter converting direct-current power output from the power conversion apparatus into alternating-current power.

12. A blower comprising
the motor drive apparatus according to claim 11.

13. A compressor comprising
the motor drive apparatus according to claim 11.

14. An air conditioner comprising
the blower according to claim 12.

15. An air conditioner comprising
the compressor according to claim 13.

* * * * *